United States Patent Office 3,310,548
Patented Mar. 21, 1967

3,310,548
DYEABLE POLYOLEFINS
Gabriel Karoly, Elizabeth, and Allen Noshay, East Brunswick, N.J., and Albin F. Turbak, Danville, Ill., assignors to Esso Research and Engineering Company, a corporation of Delaware
No Drawing. Filed Nov. 29, 1963, Ser. No. 327,096
6 Claims. (Cl. 260—93.7)

This invention relates to a process for treating alpha olefin polymers to render them dyeable, and the composition produced thereby.

Poly alpha olefin polymers have found increasing interest as textile fibers and materials because of their desirable properties of strength and low cost. One of the more difficult problems encountered, however, has been the poor dye acceptance of such fibers because of the inertness of a hydrocarbon polymer. Although a poly alpha olefin material, such as polypropylene, can be dyed, its fastness to typical textile environments has been inadequate.

It has now been found that the receptivity of alpha olefin polymers to dyeing may be improved by blending the polymer with 0.1 to 20.0 weight percent, preferably 0.2 to 5.0 weight percent, of a nickel salt of an organic dicarboxylic acid. The polymer may then be spun into fibers and contacted with dyes. By means of this treatment, not only is the dye uptake of the polymer improved, but more importantly, the resistance of the dyed product to light, washing, and dry cleaning is improved.

An additional and very important advantage of these nickel dicarboxylate substances is that when the polymer which has been blended with these materials is spun into filaments at high temperature and pressure, the resulting fiber is white.

The fiber does not discolor during this process because these nickel dicarboxylate substances do not react with the sulfur-containing stabilizers which are often conventionally dispersed in the hot polymer mix. These stabilizers are generally present in amounts of between 0.1 to 1.0 weight percent of the polymer. Some examples of these stabilizing agents which contain sulfur are: di-tert-octyl trisulfide, di-tert-octyl tetrasulfide, dilaurylthiodipropionate, distearylthiodipropionate, the esters of polysulfides derived from β-mercaptopropionic acid, and zinc dibutyl dithiocarbamate.

While this invention is principally directed to the dyeing of fibers or filaments, it may also be used to dye poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene and poly 1-heptene. Polymers or copolymers of branched chain alpha olefins where the branching occurs no closer than the third carbon atom can also be employed such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers and alpha olefin-aromatic olefin copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have viscosity average molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organo-metallic activators. Examples of these catalysts are $TiCl_4 + AlEt_3$ and $TiCl_3 + AlEt_3$. The catalysts used for preparing the preferred polymers employed in the instant process are those catalysts given on page 6, line 20, to page 10, line 21, of copending application Serial No. 831,210, filed August 3, 1959.

The nickel dicarboxylates of this invention are monomeric or polymeric nickel salts of organic dicarboxylic acids having the stoichiometric formula

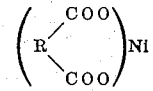

where R may be a substituted or unsubstituted alkyl, aryl, or aralkyl group. Preferably R contains from 1 to 12 carbon atoms. Examples of these salts include succinate, fumarate, maleate, phthalate, terephthalate, isophthalate, dodecanedioate, and meta phenylenedioxydiacetate. Preferred is nickel fumarate.

It is important to note that nickel monocarboxylates are not useful in this invention because they react with the sulfur-containing stabilizers and discolor the polymer so that the fibers spun therefrom range in color from dark gray to black. Actually this discoloration can be observed even if the polymer blend is extruded at relatively low temperatures, although it is more pronounced when the blend is spun, at elevated temperatures, into filaments. Thus inoperative monocarboxylates include, for example, nickel 2-ethylhexanoate, nickel pelargonate, nickel hendecanoate, nickel myristate, and nickel stearate.

The dyes which are useful in this invention are chelatable dyes. These include the "Koprolene" dyes and the "National Polypropylene" series of dyes produced by the Koppers Company and the National Aniline Company respectively. Examples of these are Koprolene Garnet R, Koprolene Blue R, Polypropylene Violet 3BR, Polypropylene Green B, Polypropylene Brilliant Blue B and Polypropylene Brilliant Orange R. Also useful are ortho hydroxy azo dyes. These dyes include mono-azo dyes, conjugated di- and multi-azo dyes as well as azo-pyrazolone, o,o'-dihydroxy azo and o-hydroxy-o-carboxy azo type dyes. Examples of these are Orasol Yellow 3G (Solvent Yellow 17), Sudan Orange RRA (Solvent Orange 7), Sudan Red 4BA (Oil Red 24), and Oil Red O (Solvent Red 27), and benzothiazole-containing ortho hydroxy azo dyes.

The formulas for some of these ortho hydroxy azo dyes as shown below:

Orasol Yellow 3G (Solvent Yellow 17)

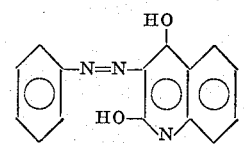

Sudan Orange RRA (Solvent Orange 7)

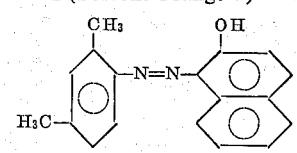

Sudan Red 4BA (Oil Red 24)

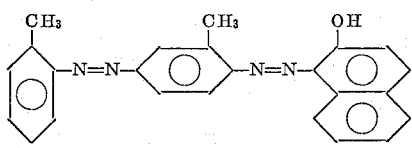

Oil Red O (Solvent Red 27)

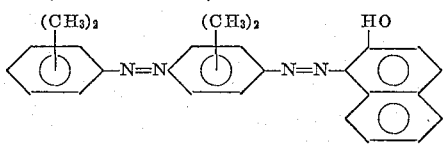

6-methoxy, 2-amino benzothiazole coupled with 3,4 xylenol

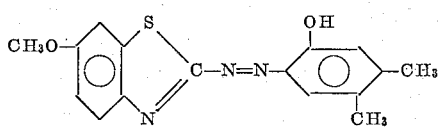

6-methoxy, 2-amino benzothiazole coupled with β-naphthol

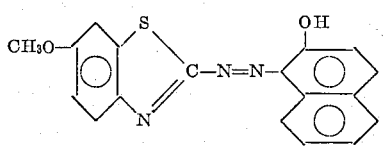

The polymer blend which has been melt spun or extruded into fibers or molded objects is contacted with the aqueous dye bath. In general the dye baths employed contain from 0.1 to 10 weight percent of dye based on the weight of the goods to be dyed. The temperature of dyeing and the time of immersion depend on the concentration of nickel compound in the blend, the particular nickel derivative employed, the concentration of dye employed, and the intensity of color desired. These parameters can easily be determined by routine experimentation. The temperature of dyeing is not critical although the dye bath is usually maintained at the boiling point.

This invention will be more fully understood by reference to the following examples.

EXAMPLE 1

A polypropylene polymer was formed by passing propylene gas into a dispersion containing Al(Et)$_3$ and TiCl$_3$ in an aromatic diluent at a temperature of 80° C.

Hydrogen was used to control the molecular weight. A crystalline polypropylene resulted having an intrinsic viscosity of 2.0 (in tetralin at 120° C.) and a melt index of 7. This polymer was blended with 0.5 weight percent of dilaurylthiodipropionate as a stabilizer and then spun into fibers by methods known in the art. When these fibers were contacted with the dyes suitable for this invention such as the National Polypropylene dyes, Koprolene dyes, Orasol Yellow 3G, and 6-methoxy, 2-amino benzothiazole coupled with 3,4-xylenol, little dye pickup and essentially no fastness were observed.

EXAMPLE 2

0.31 weight percent of nickel fumarate (3.1 grams) was blended with the stablized polypropylene powder of Example 1 (996.9 grams) by mixing in a Waring Blendor and extruding and pelletizing in a Brabender extruder at 500° F.

This blend was melt spun at 570° F. in a continuous spinning unit into 195/34 multifilaments which were then drawn at a 3.5/1 ratio. The fibers obtained had 5.7 grams per denier tenacity and 32% elongation, and they were optically white.

The resulting fibers were contacted with Polypropylene Green B, Polypropylene Violet 3BR, and Polypropylene Brilliant Orange R, as follows: The dyeings were carried out in water at 95° C. for 1 hour in dye baths containing 1 weight percent dyestuff and 0.5 weight percent nonionic (Igepal) surfactant. The fibers dyed well with all three dyestuffs. The dyed fibers were examined according to the AATCC test procedures, and found to have a rating of 5 for wash, dry cleaning and light fastness.

EXAMPLE 3

The fibers of Example 2 were contacted with a dye produced by coupling 6 methoxy, 2-amino benzothiazole with β-naphthol. The fibers had excellent wash, dry cleaning and light fastness according to AATCC test procedures.

EXAMPLE 4

Examples 2 and 3 were repeated with the exception that nickel terephthalate was used in place of the nickel fumarate. 0.40 weight percent of nickel terephthalate was blended with the polypropylene so that an equivalent amount of nickel was in the fiber. The blend was melt spun under the same conditions and a white fiber was produced having 5.6 grams per denier tenacity and 32% elongation. These fibers dyed equally well with the dyes of Examples 2 and 3 and displayed equal fastness.

EXAMPLE 5

Example 2 was repeated except that 1.0 weight percent of nickel stearate (a monocarboxylate) was blended with the stabilized polypropylene. Fibers which were spun under the same conditions as in Example 2 were an unsatisfactory dark gray in color.

Similar poor results are obtained when other nickel monocarboxylates such as nickel myristate or nickel pelargonate are used.

This invention has been described in connection with certain specific embodiments thereof; however, it should be understood that these are by way of example rather than by way of limitation, and it is not intended that the invention be restricted thereby.

What is claimed is:

1. A dyeable composition of matter consisting of a polymer of a hydrocarbon alpha olefin blended with a nickel dicarboxylate of the formula:

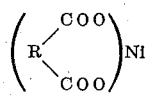

where R is selected from the class consisting of substituted and unsubstituted alkyl, aryl and aralkyl groups.

2. The composition of claim 1 wherein R has between 1 and 12 carbon atoms.

3. The composition of claim 2 wherein the polymer is polypropylene.

4. The composition of claim 3 wherein the nickel dicarboxylate is nickel fumarate.

5. The composition of claim 4 which contains 0.2 to 5.0 weight percent of nickel fumarate.

6. The composition of claim 3 which contains 0.2 to 5.0 weight percent of nickel terephthalate.

References Cited by the Examiner

UNITED STATES PATENTS

| | | | |
|---|---|---|---|
| 2,984,634 | 5/1961 | Cadwell et al. | 260—94.9 |
| 3,112,159 | 11/1963 | Cappuccio et a. | 260—94.9 |
| 3,163,492 | 12/1964 | Thomas | 260—45.7 |

JOSEPH L. SCHOFER, *Primary Examiner.*

L. EDELMAN, *Assistant Examiner.*